United States Patent
Amaral et al.

(10) Patent No.: US 9,810,182 B2
(45) Date of Patent: Nov. 7, 2017

(54) HEAT EXCHANGER FOR THE FEEDING OF FUEL IN AN INTERNAL COMBUSTION ENGINE

(71) Applicant: MAHLE METAL LEVE S.A., Jundiaí-SP (BR)

(72) Inventors: Tadeu Miguel Malagó Amaral, São Paulo-SP (BR); Edson Valdomiro de Azevedo Júnior, São Paulo-SP (BR)

(73) Assignee: MAHLE METAL LEVE S.A., Jundiai-SP (BR)

( * ) Notice: Subject to any disclaimer, the term of this patent is extended or adjusted under 35 U.S.C. 154(b) by 56 days.

(21) Appl. No.: 14/901,184

(22) PCT Filed: Jul. 1, 2014

(86) PCT No.: PCT/BR2014/000215
§ 371 (c)(1),
(2) Date: Dec. 28, 2015

(87) PCT Pub. No.: WO2015/000046
PCT Pub. Date: Jan. 8, 2015

(65) Prior Publication Data
US 2016/0160813 A1    Jun. 9, 2016

(30) Foreign Application Priority Data

Jul. 2, 2013 (BR) .......................... 1020130170950

(51) Int. Cl.
*F28F 3/08* (2006.01)
*F02M 31/14* (2006.01)
(Continued)

(52) U.S. Cl.
CPC ............ *F02M 31/14* (2013.01); *F01M 5/002* (2013.01); *F01P 3/20* (2013.01); *F01P 11/08* (2013.01);
(Continued)

(58) Field of Classification Search
CPC .... F28F 2009/004; F28F 93/08; F28F 93/083; F28F 2280/06; F28F 9/26;
(Continued)

(56) References Cited

U.S. PATENT DOCUMENTS 2,435,041 A * 1/1948 Hild .................. F01M 5/001
123/142.5 E
2,991,777 A * 7/1961 Foreman ............... F02M 31/10
123/557

(Continued)

FOREIGN PATENT DOCUMENTS

BR    102013004382-6 A2    11/2014
BR    102013017095 A2    6/2015
(Continued)

OTHER PUBLICATIONS

PCT International Search Report and Written Opinion dated Sep. 12, 2014, issued in corresponding PCT Application No. PCT/BR2014/000215.

*Primary Examiner* — Marguerite McMahon
*Assistant Examiner* — Tea Holbrook
(74) *Attorney, Agent, or Firm* — Alston & Bird LLP

(57) ABSTRACT

The heat exchanger (HE) has a first stage and a second stage (E1, E2) which are seated and affixed in a connecting block seated and affixed to the engine (M). The first stage (E1) is provided with a fuel inlet nozzle and a fuel outlet nozzle which are connected to the supply of fuel to the engine (M), and the connecting block defines: a return conduit, communicating an outlet of a cooling water circuit of the engine (M) with a water inlet in the first stage (E1); an interconnecting conduit communicating a water outlet of the first stage (E1) with a water inlet of the second stage (E2); an outlet conduit communicating a water outlet of the second stage (E2) with an inlet of a water radiator having an outlet; and two oil (Continued)

conduits, communicating a lubricant oil circuit of the engine (M) with the second stage (E2).

10 Claims, 9 Drawing Sheets

(51) Int. Cl.
    *F01M 5/00*     (2006.01)
    *F02M 31/10*     (2006.01)
    *F28F 9/26*     (2006.01)
    *F28D 9/00*     (2006.01)
    *F01P 3/20*     (2006.01)
    *F01P 11/08*     (2006.01)
    *F28D 21/00*     (2006.01)
    *F28F 9/00*     (2006.01)

(52) U.S. Cl.
    CPC .......... *F02M 31/10* (2013.01); *F02M 31/102* (2013.01); *F28D 9/005* (2013.01); *F28D 21/00* (2013.01); *F28F 9/26* (2013.01); *F28D 2021/008* (2013.01); *F28D 2021/0026* (2013.01); *F28D 2021/0089* (2013.01); *F28F 2009/004* (2013.01); *F28F 2280/06* (2013.01); *Y02T 10/126* (2013.01)

(58) Field of Classification Search
    CPC ........ F28D 1/0426–1/0452; F28D 2021/0026; F28D 2021/008; F28D 2021/0089; F28D 21/00; F28D 9/005; F01M 5/002; F01P 11/08; F01P 3/20; F02M 31/10; F02M 31/102; F02M 31/14; Y02T 10/126

USPC .......... 123/557, 547, 553; 165/144
See application file for complete search history.

(56) References Cited

U.S. PATENT DOCUMENTS

| | | | | |
|---|---|---|---|---|
| 6,305,466 | B1* | 10/2001 | Andersson | F28D 9/005 165/140 |
| 6,360,702 | B1* | 3/2002 | Osada | F28D 7/0066 123/196 AB |
| 6,502,405 | B1* | 1/2003 | Van Winkle | F01P 9/06 62/239 |
| 7,753,105 | B2* | 7/2010 | Acre | B60H 1/3227 165/140 |
| 8,752,522 | B1* | 6/2014 | Cohen | F01P 3/18 123/195 A |
| 2004/0069471 | A1 | 4/2004 | Corduan et al. | |
| 2012/0247740 | A1* | 10/2012 | Gertner | F28D 9/0006 165/148 |
| 2014/0124170 | A1* | 5/2014 | Young | F01P 3/20 165/104.14 |
| 2016/0017822 | A1 | 1/2016 | Amaral et al. | |

FOREIGN PATENT DOCUMENTS

| | | |
|---|---|---|
| CN | 105612339 A | 5/2016 |
| EP | 3017177 A | 5/2016 |
| JP | H06-34283 A | 2/1994 |
| JP | H11-337227 A | 12/1999 |
| WO | WO 2015/000046 A1 | 1/2015 |

* cited by examiner

HEAT EXCHANGER FOR THE FEEDING OF FUEL IN AN INTERNAL COMBUSTION ENGINE

CROSS-REFERENCE TO RELATED APPLICATIONS

This application is the National Stage of International Application No. PCT/BR2014/000215, filed Jul. 1, 2014 and published as WO/2015/000046 on Jan. 8, 2015. The International Application claims priority to Brazilian Application Serial No. BR1020130170950, filed Jul. 2, 2013. All of the above applications are incorporated herein by reference in their entireties.

FIELD OF THE INVENTION

The present invention refers to a heat exchanger, for example of the type using plates, developed for allowing a sequential triple thermal interaction between the fuel, to be injected into an internal combustion engine under normal operation, and the two cooling fluids, defined by the lubricant oil and by the water, so that the fuel may be selectively and adequately heated under control of a thermal management system for the feeding of different fuels to the engine, each fuel presenting a respective and particular flash or vaporization point.

BACKGROUND OF THE INVENTION

As disclosed in the Brazilian patent application BR 10 2013 004382-6 of the same applicant, gains in energy efficiency, in improved drivability and in the reduction of pollutant emission may be achieved by a thermal management system for the feeding of fuel in an internal combustion engine, which is capable to maintain the fuel at a temperature more adequate to combustion upon being fed to the engine. The thermal management system includes a heat exchanger which uses, as a heat source, the thermal energy dissipated by the engine, without requiring extra generation of energy.

One of the means to dissipate thermal energy is the vehicle radiator, which comprises a heat exchanger for cooling the engine, avoiding its overheating, by the thermal exchange of the engine and components thereof to the atmosphere, through the radiator of the vehicle and using water as an intermediate fluid.

However, the heat transmitted from the engine to the water of the radiator is a lost and even undesirable energy, since if said heat stays stored in the water, the latter loses efficiency as a thermal exchange fluid. The cooler the water of the radiator, the higher the amount of heat the water is capable to absorb from the engine, in a shorter time interval.

Another known means for dissipating the thermal energy of the engine is the lubricant oil itself which, besides lubricating the movable parts of the engine, allows the heat generated by the latter to be conducted to the outside of the engine and dissipated in the atmosphere. Some parts of the engine, such as the crankshaft, bearings, camshaft, rods and pistons, can be cooled only by the lubricant oil of the engine. When overheated, the oil loses its viscosity, is susceptible to deteriorations and consequently, loses its expected lubricating properties, as well as the capacity to cool the internal parts of the engine, impairing the proper operation of the engine components, causing severe damages or even loss of the vehicle engine.

Some vehicles, particularly heavy vehicles, are provided with an oil radiator, which takes the form of a heat exchanger, usually of the plate type, provided between the block of the engine and the necessary oil filter, usually downstream the latter, or even incorporated, in a single block, to the oil filter, as it usually occurs in heavy vehicles, in order to operate as an enhancer for the thermal exchange between the lubricant oil and the water of the radiator. However, the oil radiators presently used do not carry out thermal exchange between the oil and the fuel.

Thus, as discussed in said prior patent application BR 10 2013 004382-6, in low temperature environments, in which the fuel has its temperature reduced to values inferiorly distant from the its flashpoint ("cold fuel"), there is a greater or lesser difficulty in burning the fuel fed to the engine, which difficulty is more intensified with the use of fuels having a high flashpoint.

It should also be noted that the typical pressure in the interior of a fuel distributor in vehicles 1.0 L, having indirect injection, is of about 4.2 bar, a condition in which the vaporization temperature of the fuel is higher than its vaporization temperature under atmospheric pressure. For vehicles having direct fuel injection, these values (pressure and vaporization temperature) are further increased.

It is also known that the increase in the fuel temperature facilitates achieving a fuel spray of micrometric droplets, which will burn more easily when in contact with the spark from the ignition coil in the combustion chamber, or when they are compressed at a certain pressure (diesel).

Although the thermal exchange carried out between the heat dissipated by the running engine and the fuel is sufficient, in principle, to adequately heat a somewhat "cold" fuel, this is not a working condition which presents an optimized thermo-energetic efficiency, for it allows the occurrence of engine faults, jolts, engine slow acceleration response and emission of pollutants due to a deficient fuel burning.

In "flex vehicles" (driven by ethanol and/or gasoline in any mixture proportion) it is known that the engine yield is not optimized. An effective heating system may promote optimized conditions upon taking the fuel (for example, ethanol or gasoline) to better burning conditions (by heating the fuel to temperatures closer to the vaporization point thereof) and to a consequent better yield of the engine.

As a function of the above, it was proposed, in the previous patent application BR 10 2013 004382-6, a fuel heating management system, to be maintained operating during the entire time the engine is running, aiming at obtaining high performance (energetic optimization) of the engine, better vehicle handling, with fast responses when pressing the accelerator pedal, with optimized torque and power and with lower pollutant emissions, not only in "flex" type vehicles (two or three fuels), but also in vehicles provided with an internal combustion engine running on any fuel, liquid or gaseous.

One of the solutions proposed in said prior patent application, specifically the one illustrated in FIG. 3, comprises a management system for the feeding of fuel which is capable to absorb, by means of a common heat exchanger, the desired thermal energy both from the cooling water flow and from the lubricating oil flow of the engine. However, said prior patent application does not limit the invention to one type of heat exchanger which may be applied to the thermal management system, in order to use, when necessary, the heat which is dissipated by the flows of cooling water and of lubricant oil which are heated in the interior of the engine and conducted to the water and oil radiators, respectively.

SUMMARY OF THE INVENTION

The present invention has, as an object, to provide a heat exchanger, for example, of the type having plates, to be used jointly with a thermal management system for the feeding of fuel in an internal combustion engine during normal operation, in order to provide a triple and sequential thermal interaction between the fuel and the two cooling fluids, defined by water and by the lubricant oil, in order to selectively and adequately heat the fuel, to temperatures closer to that of its vaporization point, while obtaining a desirable cooling of both the cooling water and the lubricant oil, by means of a compact and strong construction, which may be easily and quickly applied to the circuits of cooling water and of circulation of lubricant oil provided in the interior of the internal combustion engine.

The present heat exchanger is applied in an internal combustion engine provided with a cooling water circuit, having an inlet, connected to an outlet of a water radiator, and an outlet; and with a lubricant oil circuit, having an inlet and an outlet.

According to the invention, the heat exchanger comprises: a first stage and a second stage, each having a base provided with a water inlet and a water outlet, the base of the second stage having an oil inlet and an oil outlet, the first stage being provided with a fuel inlet nozzle and a fuel outlet nozzle, which are selectively connected, in parallel, to the supply of fuel to the engine; a connecting block having a first junction face and a second junction face, against which are respectively seated and affixed the bases of the first stage and of the second stage, and a mounting face seated and affixed to the engine, the connecting block defining: a return conduit, communicating the outlet of the cooling water circuit with the water inlet in the first stage; an interconnecting conduit communicating the water outlet of the first stage with the water inlet of the second stage; an outlet conduit communicating the water outlet of the second stage with an inlet of the water radiator; and two oil conduits, communicating the inlet and the outlet of the lubricant oil circuit with the oil inlet and oil outlet respectively, of the second stage.

Thus, the invention provides a triple heat exchanger, to be operatively associated with an automatic thermal management system for the feeding of fuel to an internal combustion engine in an operating regime, which provides a selective and sequential thermal exchange between the three fluids defined by the lubricant oil circulating in the interior of the engine, by the cooling water circulating through a water radiator and in the interior of the engine, and also by the fuel to be injected inside the engine at a temperature adequate to its complete burn in the interior of the combustion chamber.

With the thermal exchange between the fuel and the water in the first pack or stage, followed by a second thermal exchange between the water, circulated through the engine, and the lubricant oil, in the second pack or stage, it is possible, by means of a simple and efficient construction with a solid and compact installation, to obtain the advantages of the simultaneous cooling of both the lubricant oil and the radiator water, with a double energetic use for the fuel to be fed to the engine. The construction of the heat exchanger in two stages, both affixed to a connecting block, allows them to be mounted in a compact way and connected to the cooling water circuit and to the lubricant oil circuit by means of four ports in the engine block.

The heat exchanger proposed herein, when used together with the automatic thermal management system, allows the heating of the fuel, either single or in a mixture, to be conducted to the injection system of the engine in a better temperature condition for its combustion, reducing fuel consumption, reducing damages to the environment and improving the efficiency of both the engine and the vehicle to which it is associated, the thermal energy used for the selective heating of the fuel being obtained from the thermal energy dissipated by the internal combustion engine.

BRIEF DESCRIPTION OF THE DRAWINGS

The invention will be described below, making reference to the attached drawings, given by way of example of a possible embodiment to be applied to the present heat exchanger. In the drawings.

DESCRIPTION OF THE INVENTION

As already mentioned and illustrated in the attached drawings, the heat exchanger HE of the invention is applied to an internal combustion engine M using a single fuel, or a variable mixture of fuels presenting different vaporization temperatures, such as the case of "flex" engines using, for example, gasoline, ethanol or a mixture thereof in different proportions.

The heat exchanger HE of the invention was developed to operate together with a thermal management system TMS for the feeding of fuel during the entire operation of the vehicle, in order to keep the fuel being fed to the engine M at an optimized temperature for an efficient combustion, lower than that of the vaporization point.

The thermal management system TMS may be defined, for example, as disclosed in the prior patent application BR10 2013 004382-6, of the same applicant.

Figure 1:
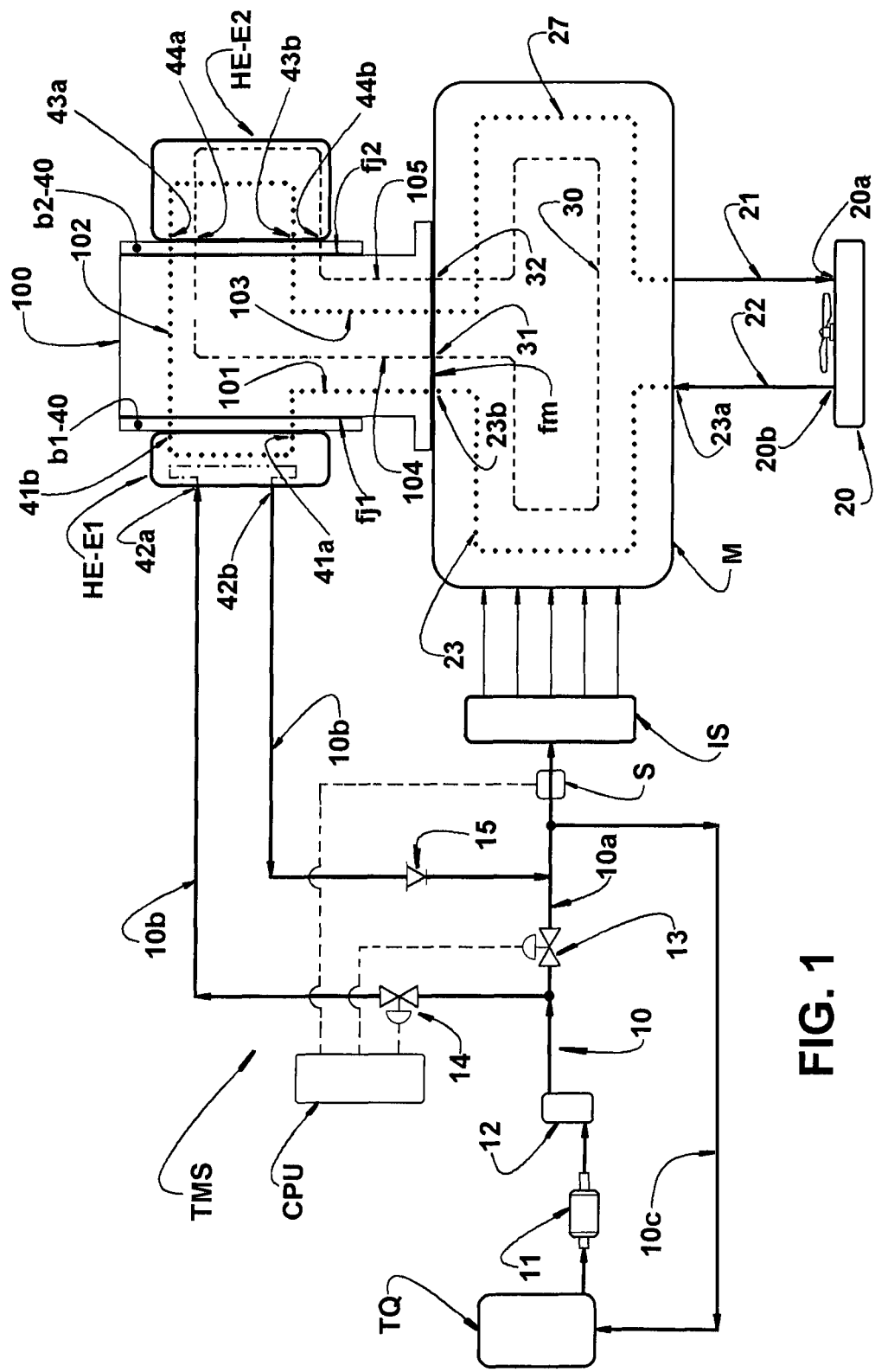
FIG. 1 represents a diagram of a thermal management system for the feeding of fuel to an internal combustion engine, said system being provided with the heat exchanger of the present invention.
Figure 2:
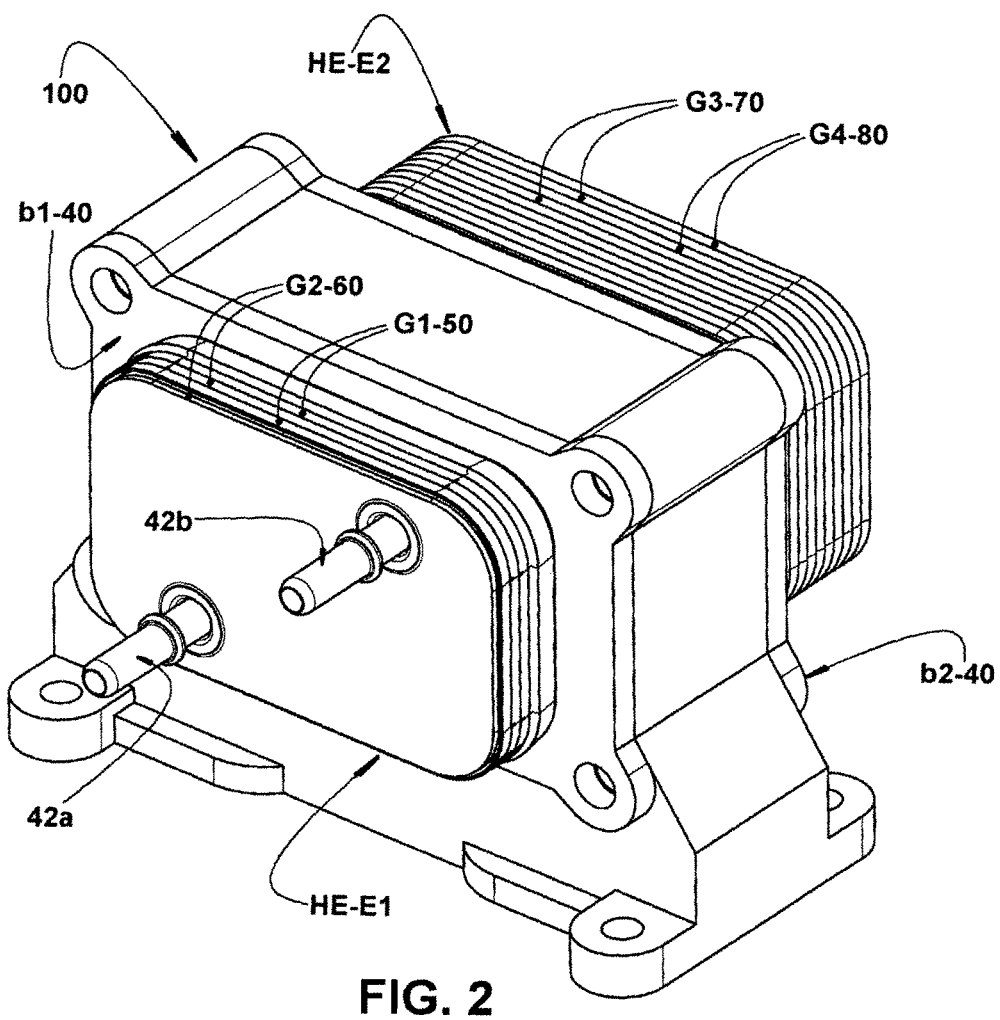
FIG. 2 represents a perspective view of a possible construction for the present heat exchanger, with the two stages being affixed to the connecting block.
Figure 3:
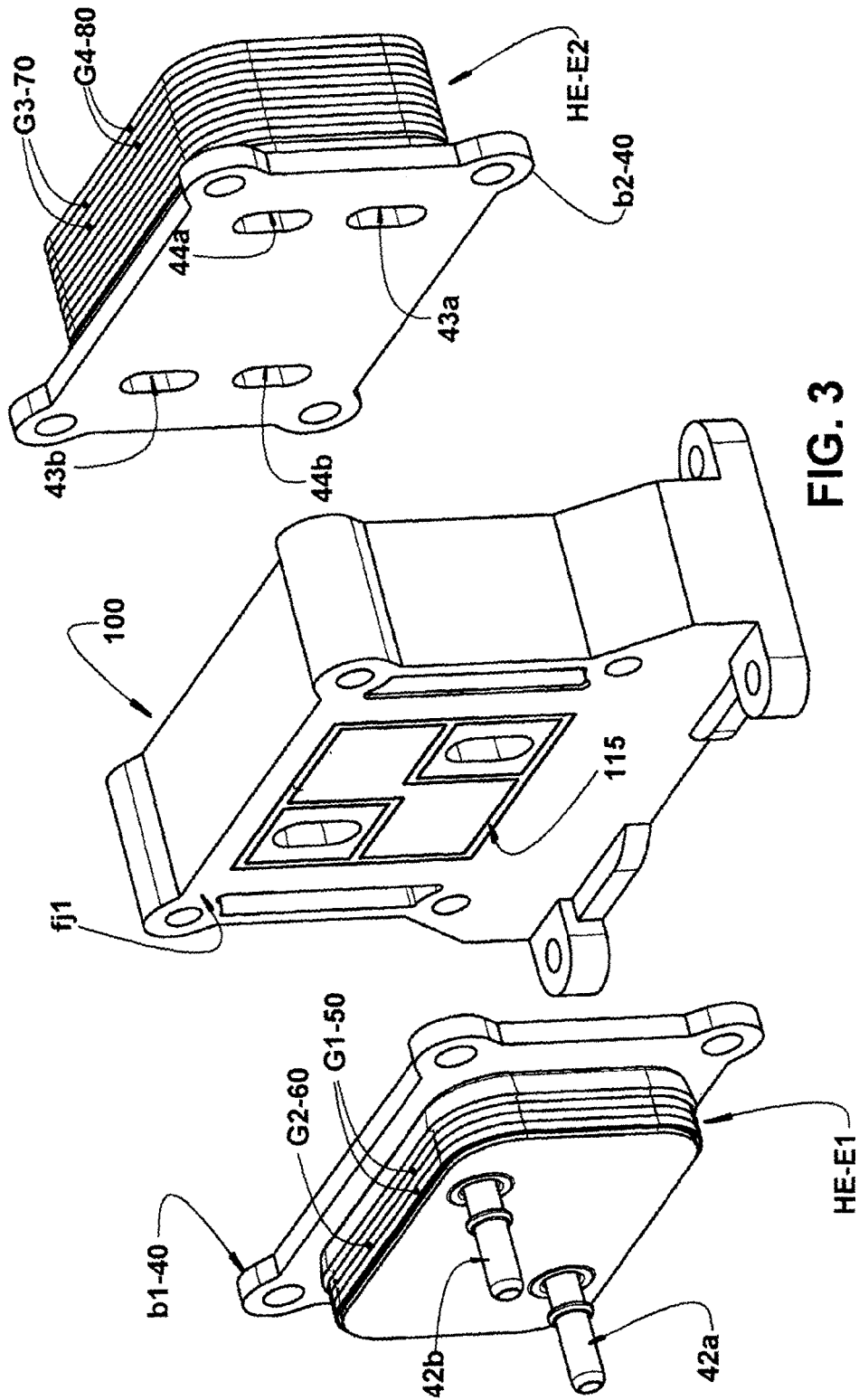
FIG. 3 represents a perspective view of the heat exchanger of FIG. 2, with the two thermal exchange stages being exploded in relation to the connecting block.
Figure 4:
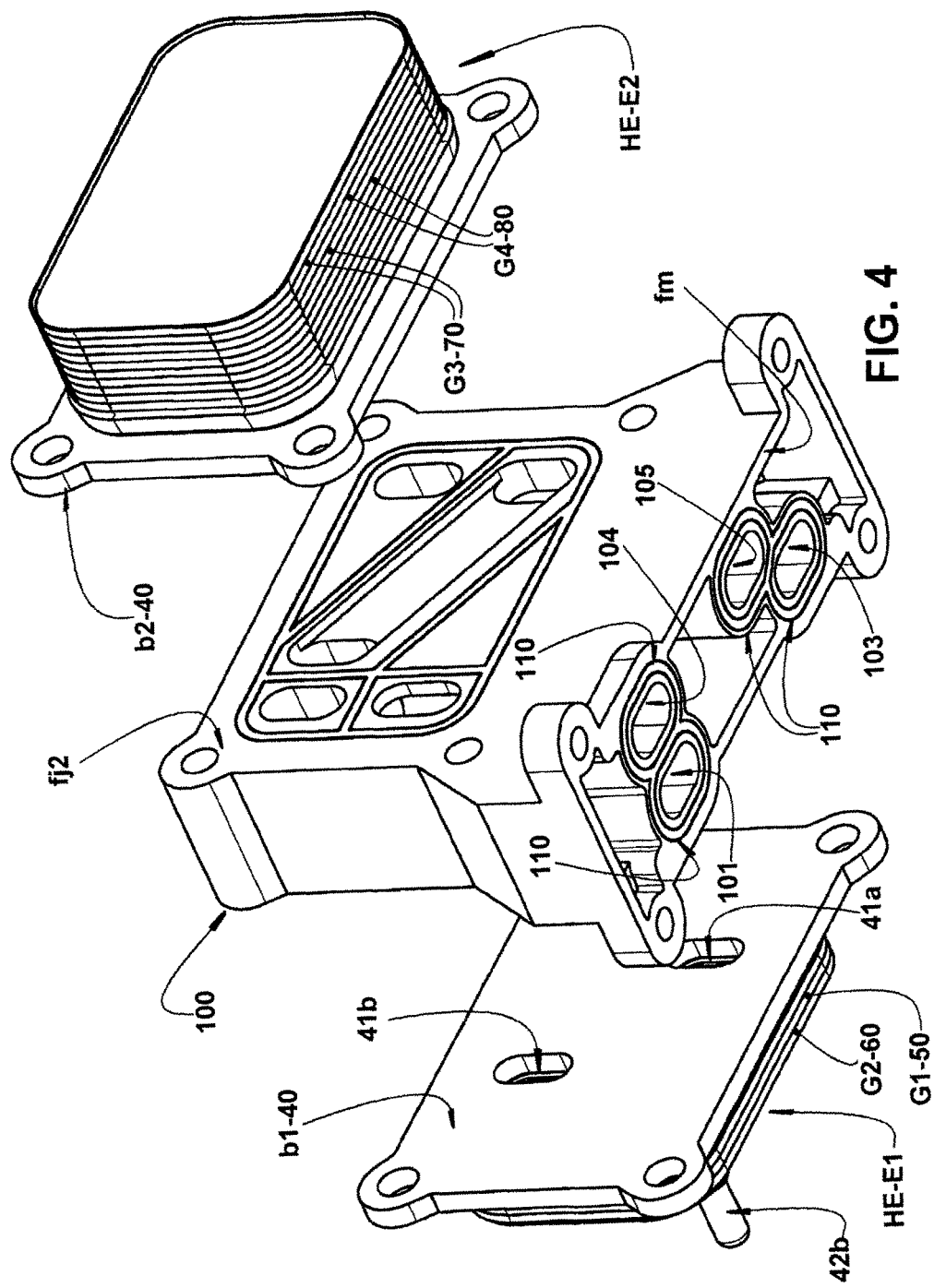
FIG. 4 represents an exploded perspective view, similar to that of FIG. 3, but illustrating the two stages and the connecting block, as seen from the side of the mounting face of the latter.
Figure 4A:
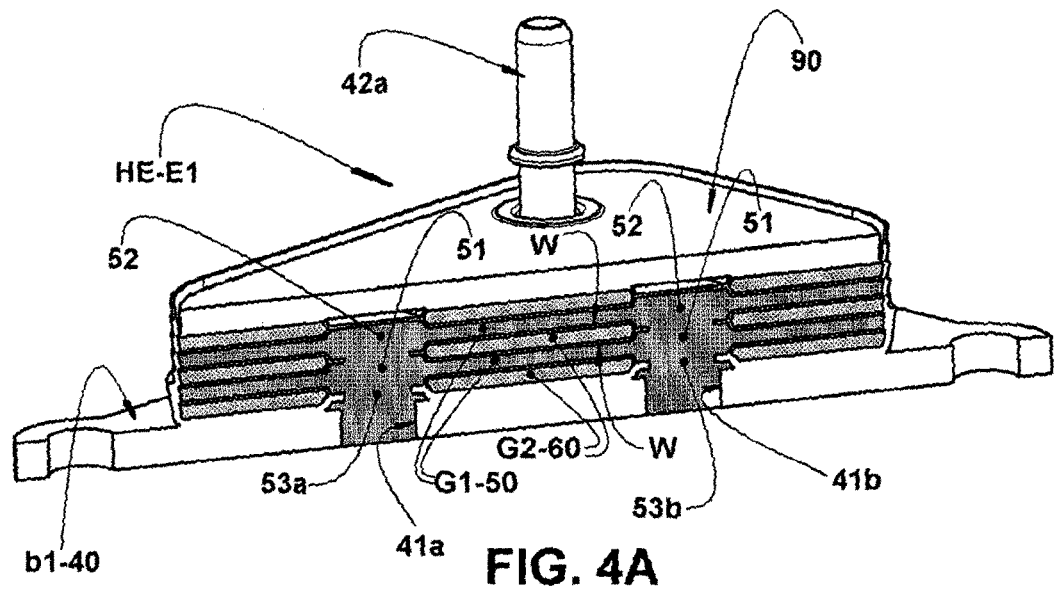
FIG. 4A represents a perspective view of the first thermal exchange stage, when cut by a plane diametrical to the two water conduits of the first group of chambers.
Figure 4B:
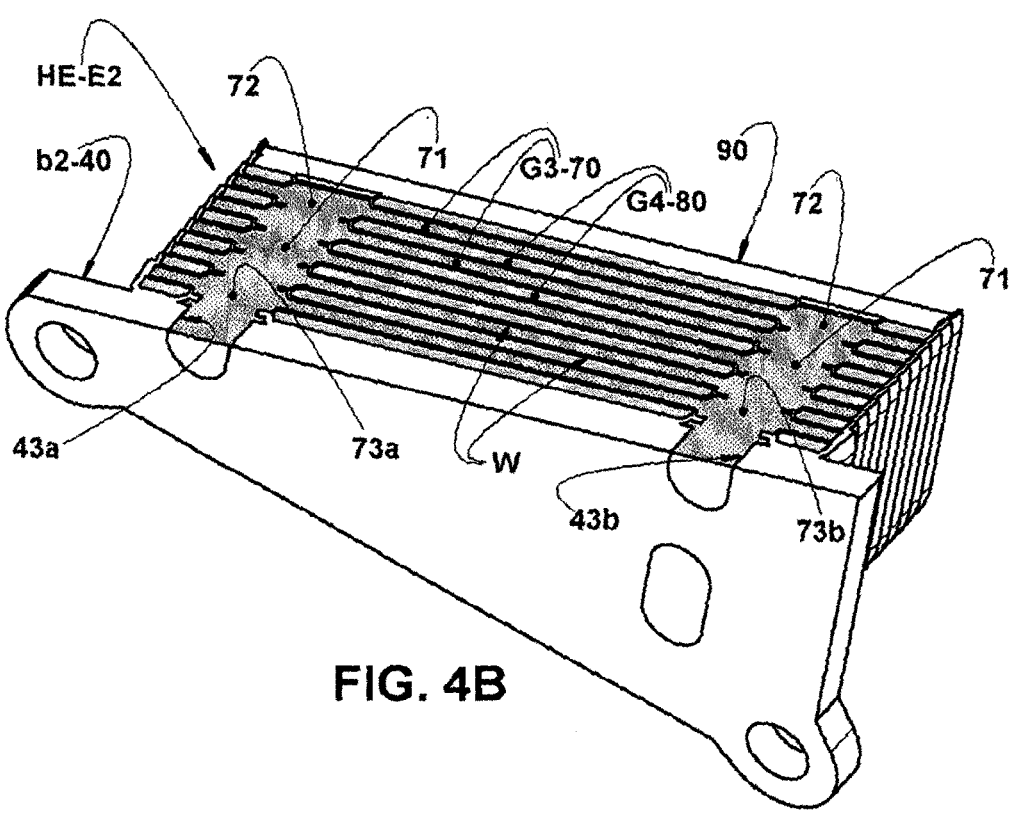
FIG. 4B represents a perspective view of the second thermal exchange stage, when cut by a plane diametrical to the two water conduits of the third group of chambers.
Figure 4C:
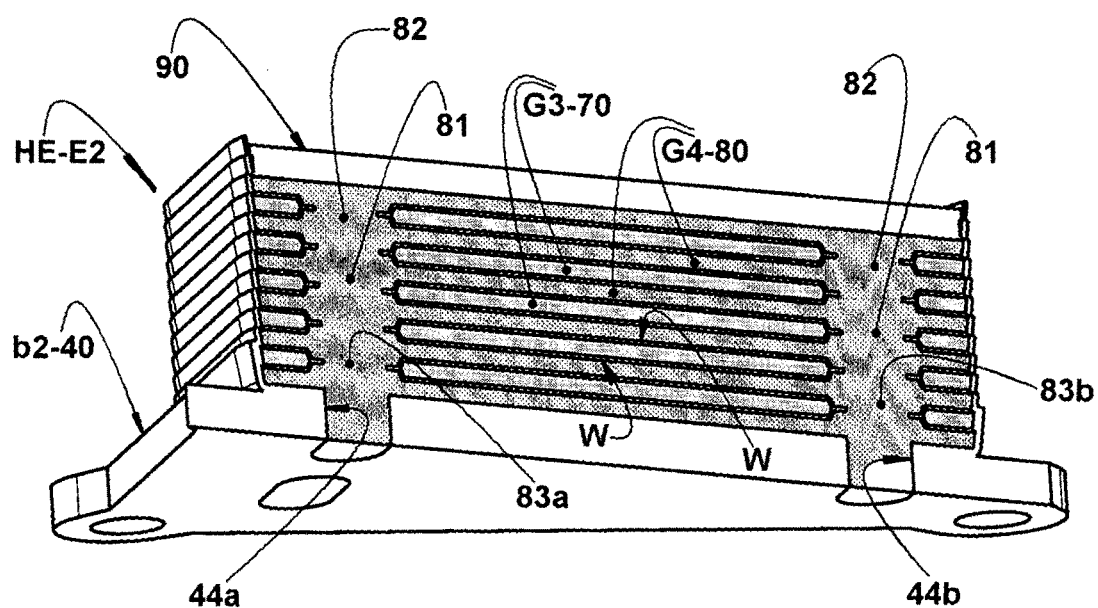
FIG. 4C represents a perspective view of the second thermal exchange stage, when cut by a plane diametrical to the two oil conduits of the fourth group of chambers.
Figure 5:
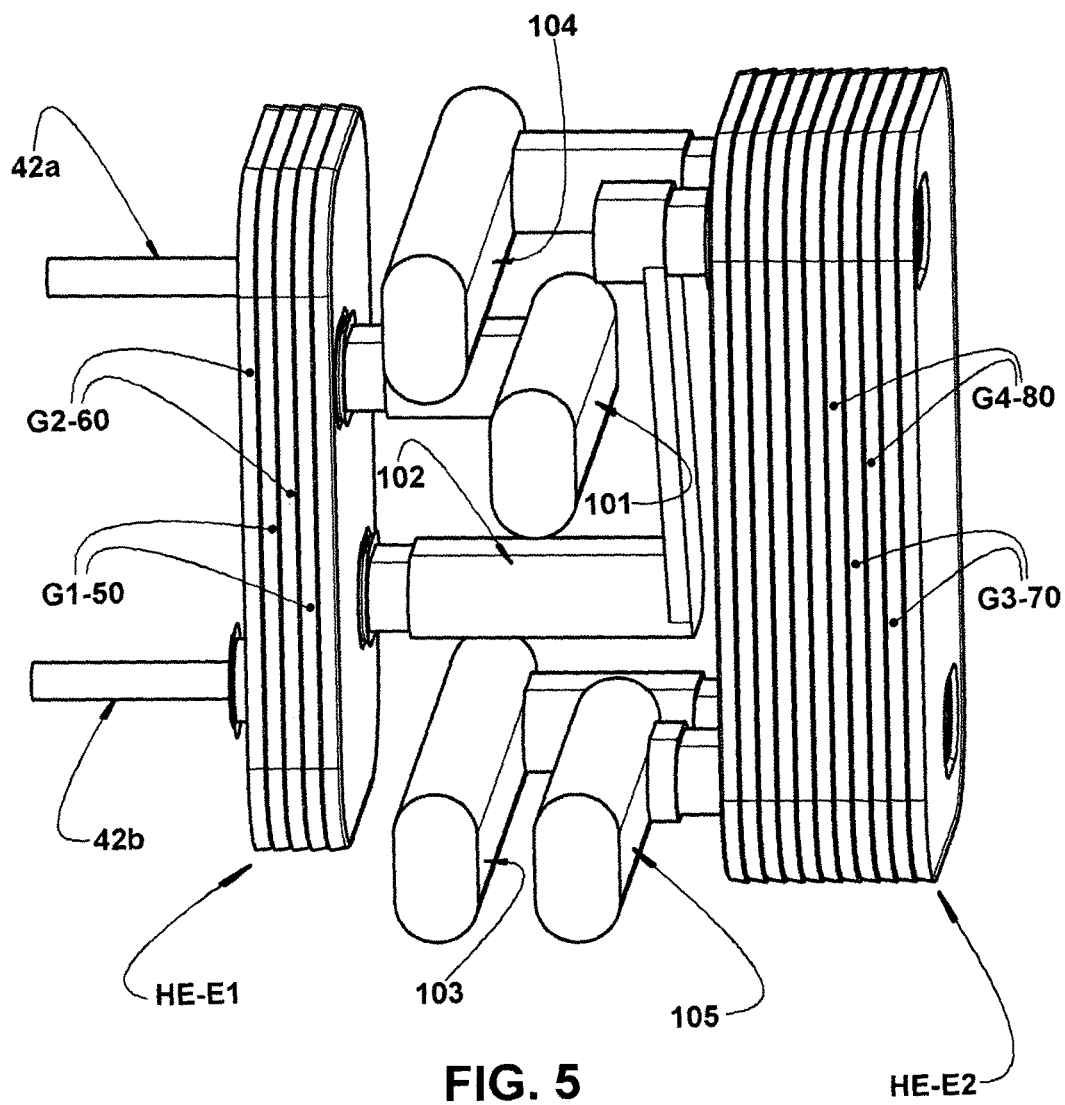
FIG. 5 represents a perspective view of the two thermal exchange stages, associated with the return conduit, interconnecting conduit and outlet conduit, which are provided in the interior of the connecting block and schematically represented.
Figure 6:
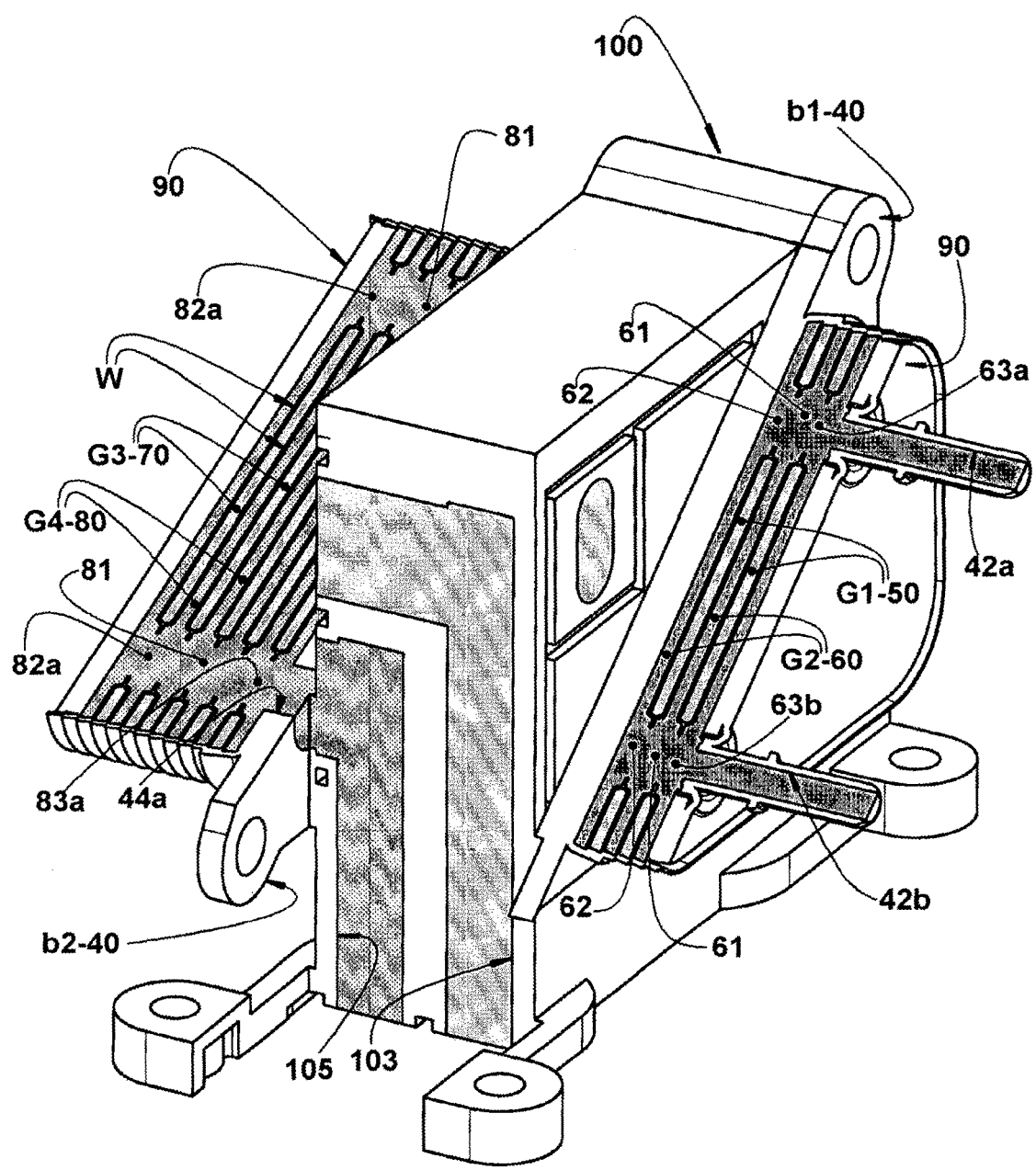
FIG. 6 represents the heat exchanger of FIG. 2 with the first stage being cut according to a plane diametrical to the fuel inlet nozzle and fuel outlet nozzle, with the second stage being cut according to a plane diametrical to the lubricant oil inlet and lubricant oil outlet, and with the connecting block being sectioned according to a plane diametrical to the water outlet conduit and oil of the second stage.
Figure 7:
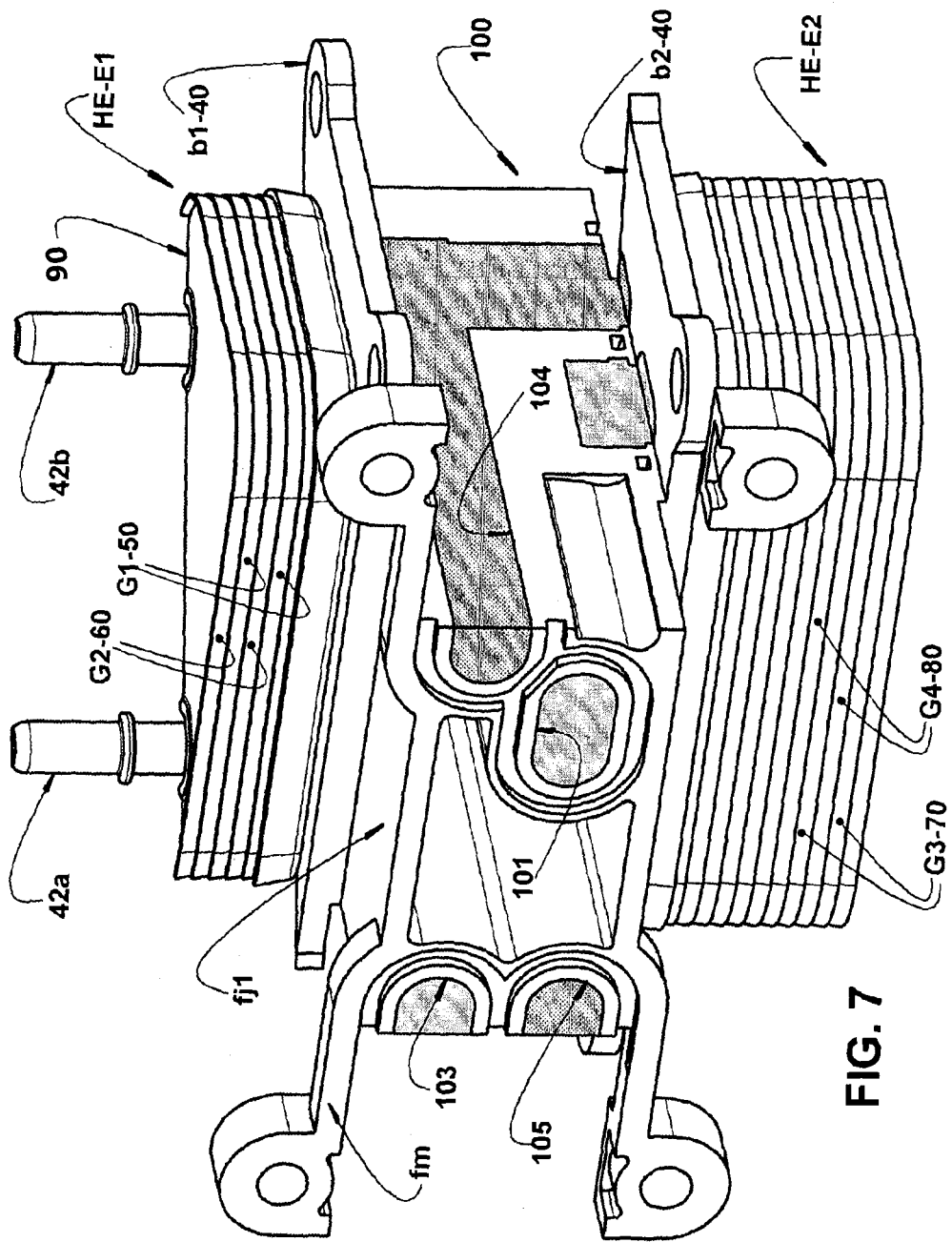
FIG. 7 represents the heat exchanger of FIG. 6 when seen from the side opposite to the section of the block, and illustrating the latter sectioned according to a plane diametrical to the oil inlet conduit in the second stage.

FIG. 1 of the appended drawings illustrates a possible embodiment for mounting the heat exchanger HE in a thermal management system TMS, operating in an internal combustion engine M provided with an injection system IS which is fed by a fuel tank TQ, by means of a fuel supply tube 10 provided with a fuel pump 11 and with a filter 12.

The fuel supply tube 10 comprises a first segment 10a connected to the injection system IS and provided with a first valve 13, and a second segment 10b which defines a derivation or by-pass to the first segment 10a, and in which is provided the heat exchanger HE.

In the illustrated mounting condition, the engine M is operatively associated with a water radiator 20 which is connected, through hot water conduits 21 and cooled water conduits 22, to a cooling water circuit 23, internal to the engine M, in order to provide the usual cooling of the latter.

The cooling water circuit 23, internal to the engine M, has an inlet 23a and an outlet 23b, the inlet 23a being connected to the outlet 20b of the water radiator 20 by means of the cooled water conduit 22, external to the engine M.

The engine M further comprises, in the interior thereof, a lubricant oil circuit 30, in which the lubricant oil circulates, presenting an inlet 31 and an outlet 32, open to the outside of the engine M, in order to be connected to the heat exchanger HE, as described hereinafter.

The heat exchanger HE comprises a first stage and a second stage E1,E2 of thermal exchange, each having a base b1,b2 provided with a water inlet and a water outlet 41a, 41b;43a;43b. The base b2 of the second stage E2 has an oil inlet and an oil outlet 44a,44b and the first stage E1 is provided with a fuel inlet nozzle and a fuel outlet nozzle 42a,42b, preferably provided on a side of the first stage E1, opposite to the base b1 and selectively connected, in parallel, to the supply of fuel to the engine M, more specifically to the fuel supply tube 10.

The heat exchanger HE further comprises a connecting block 100, constructed in adequate metallic alloy and having a first junction face and a second junction face fj1,fj2, usually opposite to each other, against which are respectively seated and affixed the bases b1,b2 of the first stage and second stage E1,E2, and a mounting face fm to be seated and affixed to the engine M.

As illustrated, the connecting block 100 defines, in its interior: a return conduit 101, communicating the outlet 23b of the cooling water circuit 23 with the water inlet 41a in first stage E1; an interconnecting conduit 102 communicating the water outlet 41b of the first stage E1 with the water inlet 43a of the second stage E2; an outlet conduit 103 communicating the water outlet 43b of the second stage E2 with an inlet 20a of the water radiator 20; and two oil conduits 104,105, communicating the inlet 31 and the outlet 32 of the lubricant oil circuit 30 with the oil inlet and oil outlet 44a,44b respectively, of the second stage E2.

According to a possible constructive form, the return conduit 101 has an end open to the mounting face fm of the connecting block 100 and to the outlet 23b of the cooling water circuit 23, and an opposite end open to the first junction face fj1 of the connecting block 100 and to the water inlet 41a in the first stage E1.

The interconnecting conduit 102, internal to the connecting block 100, has an end open to the first junction face fj1 and to the water outlet 41b of the first stage E1, and the opposite end open to the second junction face fj2 and to the water inlet 43a of the second stage E2. Thus, the water cooled in the radiator is directed to the return conduit 101, in order to pass through the first stage E1 of thermal exchange and be conducted to the second stage E2 of thermal exchange. The outlet conduit 103 has an end open to the second junction face fj2 of the connecting block 100 and to the water outlet 43b of the second stage E2, and the opposite end open to the mounting face fm of said block and maintained in fluid communication with the inlet 20a of the water radiator 20, through a conduit segment 27 provided in the interior of the engine M and through the hot water conduit 21 external to the engine M. The outlet conduit 103 allows the water flow, received in the second stage E2 of thermal exchange, to be conducted, after passing through the latter, back to the water radiator 20.

The two oil conduits 104, 105 have an end open to the mounting face fm of the connecting block 100 and to the inlet 31 and to the outlet 32, respectively, of the lubricant oil circuit 30, and an opposite end open to the second junction face fj2 of said block and to the oil inlet and to the oil outlet 44a,44b, respectively, of the second stage E2 of thermal exchange.

According to the illustrated construction, the first stage E1 comprises a first and a second group G1,G2 of chambers 50,60, and the second stage E2 comprises a third and a fourth group G3,G4 of chambers 70,80.

The chambers 50,60,70,80 of the two groups in each stage E1,E2 are alternatively overlapped and open to two spaced apart conduits 51,61,71,81, each two conduits of the same group of chambers having inner ends 52,62,72,82, open to an end chamber of the respective group and outer ends 53a,53b,63a,63b and 73a,73b,83a,83b, respectively open to the water inlet and to the water outlet 41a,41b and to the fuel inlet nozzle and fuel outlet nozzle 42a,42b in the first stage E1, and also to the water inlet and water outlet 43a,43b and to the oil inlet and oil outlet 44a,44b in the second stage E2.

In the exemplary construction illustrated in the appended drawings, the conduits 51, 61, 71, 81 of each group of chambers 50,60,70,80 are disposed through the interior of the respective stage E1, E2 of thermal exchange, crossing the chambers disposed between the end chamber of the respective group G1, G2, G3, G4, to the interior of which are open the inner ends 52, 62, 72, 82 of the respective conduits and the outer ends 53a,53b,63a,63b and 73a,73b, 83a,83b of said conduits, the latter being medianly and radially open to the chambers of the respective group crossed thereby.

In the preferred construction, the base b1,b2 of each of the two stages E1, E2 of thermal exchange is defined by a flange 40, against one side of which is seated and affixed, by any adequate means, for example, by welding, an outer wall of an adjacent end chamber of the respective stage E1,E2.

Each flange 40 presents through holes, in which are respectively defined the water inlet and the water outlet 41a,41b of the first stage E1, and also the water inlet and the water outlet 43a,43b and the oil inlet and the oil outlet 44a,44b in the second stage E2 of thermal exchange.

In the illustrated construction, the end chamber of each one of the first and second stages E1, E2, opposite to the flange 40, has its outer wall defined by a cover 90, the fuel inlet nozzle and the fuel outlet nozzle 42a,42b projecting outwardly from the cover 90 of the first stage E1.

The chambers of the two groups G1,G2;G3,G4 in each stage E1, E2 are spaced apart by a common wall W and usually constructed in metallic material having high thermal conductivity, in the form of overlapping trays, with the bottom of one defining the upper wall of the tray disposed immediately below.

The chambers 50,60,70,80 of each stage E1,E2 of chambers have the same flat elongated shape, with the height being reduced in relation to the area, each of the two conduits 51,61,71,81 of each group of chambers 50,60,70,80 being positioned in an end region, of the respective stage E1,E2 of chambers, opposite to that in which is positioned the other duct, so as to allow the fluid inlet flow, in the chambers of each group, to run through the extension of the respective chamber before reaching the other conduit through which the fluid leaves the respective group of chambers.

With the proposed construction, the chambers 50, 60 in the first stage E1 are interposed, allowing for the thermal exchange between the fuel and the water that is coming from the cooling water circuit 23 internal to the engine M, the same occurring in relation to the chambers 70, 80 which form the second stage E2, in which the thermal exchange occurs between the water, coming from the first stage E1 through the interconnecting conduit 102, and the lubricant oil circulating through the chambers 80 of the fourth group G4 of chambers.

With the construction defined above, each fluid enters into the respective group of chambers through one of the conduits, and is delivered to the respective group of chambers in the region of the latter adjacent to said conduit, in order to be displaced towards the other region of the same group of chambers, wherefrom it leaves through the other conduit, exchanging heat with the fluid circulating through the other group of chambers of the same stage.

The chambers 50, 60, 70, 80 may be constructed in any adequate material having high thermal conductivity and in the form of trays, for example, presenting the bottom wall in a substantially elongated rectangular shape, and incorporating a peripheral wall of small height, whose free edge is hermetically seated and affixed under the peripheral region of the bottom wall of an adjacent tray of the same stage E1, E2 of chambers, the last tray of the stage being superiorly closed by the end cover 90, which is hermetically seated and affixed on the free edge of said last tray.

The flange 40 of one stage E1, E2 presents through holes 47 which are aligned, externally to the connecting block 100, with respective through holes 47 of the flange 40 of the other stage, when both have their bases b1, b2 seated against respective junction faces fj1, fj2, of the connecting block 100, in order to allow applying tightening bolts, not illustrated.

Similarly, the connecting block 100 incorporates, in the region of its mounting face fm, coplanar lateral flaps 107 provided with respective through holes 108, for the passage of non-illustrated bolts, for securing the connecting block 100 to the engine M.

In order to guarantee the tightness of the connection of the junction faces fj1, fj2 and of the mounting face fm with the bases b1, b2 of the stages E1, E2 and with the engine M, the mounting face fm of the connecting block 100 is provided with sealing gaskets 110 surrounding the respective ends of the return conduit 101, of the water outlet conduit 103 and of the lubricant oil inlet conduit 104 and lubricant oil outlet conduit 105. Likewise, the junction faces fj1, fj2 of the connecting block 100 are provided with at least one sealing gasket 115 disposed so as to surround the respective ends of the return conduit 101 and of the interconnecting conduit 102 facing the first stage E1, and also the respective ends of the interconnecting conduit 103, of the outlet conduit 103, and of the oil conduits 104, 105 facing the second stage E2.

As already previously described and considering that the temperature of the lubricant oil in the interior of the engine M is higher than the temperature of the cooling water leaving the engine M, towards the radiator 20, and that the temperature of said water is higher than the temperature to which the fuel will be heated, the fuel chambers 60 of the second group G2 of the first stage E1 present common walls W only with the cooling water chambers 50 of the first group G1 still in the first stage E1.

In the second stage E2, the chambers 70 of the third group G3, containing cooling water coming from the first stage E1, present common walls W only with the chambers 80 of the fourth group G4 containing lubricant oil.

Thus, the cooled water, coming from the radiator 20 is caused to pass through the engine M, cooling the latter and then conducted to the chambers 50 of the first group G1, in the first stage E1, where it exchanges heat with the fuel passing through the chambers 60 of the second group G2, heating the fuel and being somewhat cooled and conducted to the chambers 70 of the third group G3, in the second stage E2, where it exchanges heat with the lubricant oil circulating through the chambers 80 of the fourth group G4 of chambers.

As illustrated in FIG. 1, the second segment 10b of the fuel supply tube 10 is coupled to the fuel inlet nozzle 42a and to the fuel outlet nozzle 42b of the conduits 61 of the first stage E1 and provided with a second valve 14 disposed upstream the heat exchanger HE, and with a one-way valve 15 located downstream said heat exchanger HE.

The first valve 13 and the second valve 14 may be of the electromagnetic type, controlled by an electronic control unit CPU, which receives different operational parameters from the engine M and physical-chemical parameters from the fuel (such as temperature of the fuel being fed, characteristics of the fuel or of the mixtures of different fuels, fuel injection pressure, pressure loss, etc.), in order to determine the maximum temperature value to be used for instructing the operation of both the first valve 13 and the second valve 14.

It is further provided a return tube 10c, connecting the fuel tank TQ to a point of the fuel supply tube 10, disposed downstream the second segment 10b, in order to allow the return, to the tank TQ, of the fuel pumped to the injection system IS, but not consumed by the engine M. However, it should be understood that the return tube 10c may connected to the fuel supply tube 10 in a point upstream the second segment 10b.

The thermal management system TMS, associated with the present heat exchanger HE, may comprise electromagnetic valves, mounted individually or in valve groups and activated by the electronic control unit CPU, which is operatively associated with multiple sensors S connected to the fuel feeding system and to the engine M, for allowing the full or partial opening of the valve or valves to occur as a function of the actual necessities of heating the fuel to a temperature lower than that for vaporization of the single fuel or mixture of fuels.

The invention claimed is:

1. A heat exchanger for the feeding of fuel in an internal combustion engine provided with a cooling water circuit, having an inlet, connected to an outlet of a water radiator, and an outlet; and with a lubricant oil circuit, having an inlet and an outlet, wherein the heat exchanger comprises:
a first stage and a second stage, each having a base provided with a water inlet and a water outlet, the base of the second stage having an oil inlet and an oil outlet, the first stage being provided with a fuel inlet nozzle and a fuel outlet nozzle, which are selectively connected, in parallel, to the supply of fuel to the engine (M);
a connecting block having a first junction face and a second junction face (fj1, fj2), against which are respectively seated and affixed the bases (b1, b2) of the first stage and the second stage (E1,E2), and a mounting face (fm) seated and affixed to the engine (M), the connecting block defining: a return conduit, communicating the outlet of the cooling water circuit with the water inlet in the first stage;
an interconnecting conduit communicating the water outlet of the first stage (E1) with the water inlet of the second stage (E2); an outlet conduit communicating the water outlet of the second stage (E2) with an inlet of the water radiator; and
two oil conduits, communicating the inlet and the outlet of the lubricant oil circuit with the oil inlet and oil outlet respectively, of the second stage (E2).

2. The heat exchanger, according to claim 1, wherein the return conduit has an end open to the mounting face (fm) and to the outlet of the cooling water circuit, and an opposite end open to the first junction face (fj1) and to the water inlet in the first stage (E1); the interconnecting conduit having an end open to the first junction face (fj1) and to the water outlet of the first stage (E1), and the opposite end open to the second junction face (fj2) and to the water inlet of the second stage (E2); an outlet conduit having an end open to the second junction face (fj2) and to the water outlet of the second stage (E2) and the opposite end open to the mounting face (fm) and maintained in fluid communication with the inlet of the water radiator, through a conduit segment provided in the interior of the engine (M) and through a hot water conduit external to the engine (M); the two oil conduits having an end open to the mounting face (fm) and to the inlet and to the outlet, respectively, of the lubricant oil circuit, and an opposite end open to the second junction face (fj2) and to the oil inlet and to the oil outlet, respectively, of the second stage (E2).

3. The heat exchanger, according to claim 1, wherein the inlet of the cooling water circuit is connected to the outlet of the water radiator through a cooled water conduit external to the engine (M).

4. The heat exchanger, according to claim 1, wherein the fuel inlet nozzle and the fuel outlet nozzle are provided on a side of the first stage (E1) opposite to the base (b1).

5. The heat exchanger, according to claim 1, wherein the first stage (E1) comprises a first group and a second group (G1,G2) of chambers, the second stage comprising a third group and a fourth group (G3,G4) of chambers, the chambers of the two groups in each stage (E1,E2) being alternatively overlapped and open to two spaced apart conduits, each two conduits of the same group of chambers having inner ends, open to an end chamber of the respective group and outer ends respectively open to the water inlet and water outlet and to the fuel inlet nozzle and fuel outlet nozzle in the first stage (E1) and also to the water inlet and water outlet and to the oil inlet and oil outlet in the second stage (E2).

6. The heat exchanger, according to claim 5, wherein the conduits of each group of chambers are disposed through the interior of the respective stage (E1, E2), crossing the chambers located between the end chamber of the respective group (G2, G2, G3, G4), to the interior of which are open the inner ends of the respective conduits and the outer ends of said conduits, the latter being medianly and radially open to the chambers of the respective group crossed thereby.

7. The heat exchanger, according to claim 6, wherein the base (b1,b2) of each one of the two stages (E1, E2) is defined by a flange, against one side of which is seated and affixed an outer wall of an adjacent end chamber of the respective stage (E1,E2), said flange presenting through holes in which are respectively defined the water inlet and the water outlet of the first stage (E1) and the water inlet and the water outlet and the oil inlet and the oil outlet of the second stage (E2).

8. The heat exchanger, according to claim 7, wherein the end chamber, of each one of the first stage and second stage (E1,E2), opposite to the flange, has its outer wall defined by a cover, the fuel inlet nozzle and the fuel outlet nozzle projecting outwardly from the cover of the first stage (E1).

9. The heat exchanger, according to claim 5, wherein the chambers of the two groups (G1,G2;G3,G4) in each stage (E1, E2) are separated from each other by a common wall (W).

10. The heat exchanger, according to claim 5, wherein the chambers of each stage (E1,E2) of chambers have the same elongated flat shape, with a height reduced in relation to the area thereof, each one of the two conduits, of each group of chambers, being positioned in an end region, of the respective stage (E1,E2) of chambers, opposite to that in which the other conduit is positioned.

* * * * *